(12) United States Patent
Smith et al.

(10) Patent No.: US 6,375,577 B1
(45) Date of Patent: Apr. 23, 2002

(54) UNIVERSAL STYLE COUPLING

(75) Inventors: Thomas L. Smith, Campbell; Peter A. Holst, Castro Valley, both of CA (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/428,619

(22) Filed: Oct. 27, 1999

(51) Int. Cl.$^7$ ................................. F16D 3/16
(52) U.S. Cl. .................. 464/136; 464/112; 464/106
(58) Field of Search ........................... 464/104, 105, 464/106, 112, 115, 117, 119, 125, 136, 137, 149, 157, 185, 905

(56) References Cited

U.S. PATENT DOCUMENTS

| | | |
|---|---|---|
| 79,153 A | 6/1868 | Smead |
| 1,334,537 A | 3/1920 | Hupp |
| 1,346,253 A | 7/1920 | Rayfield |
| 1,491,186 A * | 4/1924 | Barlett ............... 464/106 |
| 1,870,343 A * | 8/1932 | Neave ............... 464/106 |
| 2,051,085 A | 8/1936 | Ilseman |
| 2,202,679 A | 5/1940 | Woodin |
| 2,804,759 A | 9/1957 | Hartmann |
| 2,899,808 A | 8/1959 | Berens |
| 3,406,534 A * | 10/1968 | Chapper ............... 464/905 |
| 3,485,062 A | 12/1969 | Blake |
| 3,710,048 A | 1/1973 | Schumacher |
| 3,837,179 A | 9/1974 | Barth |
| 3,884,049 A | 5/1975 | Pauli |
| 4,171,627 A | 10/1979 | Fukuda |
| 4,193,748 A | 3/1980 | Swain |
| 4,242,887 A | 1/1981 | Payne |
| 4,403,885 A | 9/1983 | Babb |
| 4,572,682 A * | 2/1986 | Iwata ............... 464/119 |
| 4,609,364 A | 9/1986 | Labbe |
| 4,644,207 A | 2/1987 | Catterfeld et al. |
| 4,778,349 A | 10/1988 | Browning |
| 4,818,186 A | 4/1989 | Pastrone et al. |
| 5,033,433 A | 7/1991 | Churchill et al. |

(List continued on next page.)

FOREIGN PATENT DOCUMENTS

| | | |
|---|---|---|
| DE | 1 209 369 | 1/1966 |
| EP | 0 947 728 A2 | 10/1999 |
| FR | 2 735 822 | 12/1996 |

*Primary Examiner*—Lynne H. Browne
*Assistant Examiner*—Kenn Thompson
(74) *Attorney, Agent, or Firm*—Beth A. Vrioni (57) ABSTRACT

A coupler for connecting a drive shaft to a driven member and accommodating a substantial misalignment between the drive shaft and the driven member, while minimizing audible noise and vibration. The coupling includes a hollow core nest element having a plurality of slots formed in one end, two substantially identical elongate body elements, and a plurality of spring elements. Each elongate body element has two ends, a first end being adapted to couple with either the drive shaft or the driven member, and a second end that includes a plurality of posts that engage the slots of the hollow core nest. An aperture in the hollow core nest is larger than the diameter of the elongate bodies, allowing for the components to move radially relative to each other to accommodate for any offset and misalignment between the longitudinal axes of the drive shaft and the driven member, while the spring elements ensure that the components positively contact one another to reduce audible noise that is otherwise produced by loose fitting components. In one embodiment, a spring element is integrally formed in the slots of the hollow core nest, such that the posts of the body elements are held in engagement with sides of the slots by the spring elements. This embodiment includes an end cap that prevents the posts from becoming disengaged from the slots. Another embodiment employs helical coil springs mounted externally around the hollow core nest.

42 Claims, 10 Drawing Sheets

U.S. PATENT DOCUMENTS

| | | |
|---|---|---|
| 5,092,821 A | 3/1992 | Gilbert et al. |
| 5,284,455 A | 2/1994 | Kuribayashi |
| 5,330,388 A * | 7/1994 | Blanding .................... 464/106 |
| 5,438,172 A * | 8/1995 | Fowler et al. .............. 464/183 |
| 5,501,542 A | 3/1996 | Hall |
| 5,525,110 A * | 6/1996 | Riccitelli et al. ........... 464/118 |
| 5,665,001 A | 9/1997 | Jacob et al. |
| 5,716,279 A | 2/1998 | Ham et al. |
| 5,718,635 A * | 2/1998 | Park et al. .................. 464/114 |
| 5,833,445 A | 11/1998 | Van Spijk |
| 5,857,553 A * | 1/1999 | Lagarde et al. ............. 464/104 |
| 5,893,851 A | 4/1999 | Umber et al. |
| 6,146,280 A * | 11/2000 | Pulfrod, Jr. ................. 464/112 |

* cited by examiner

UNIVERSAL STYLE COUPLING

FIELD OF THE INVENTION

This invention generally pertains to a connector for use in coupling a motor drive shaft to a driven member, and more specifically, to a universal style coupling for connecting a motor drive shaft to a driven member such that the coupling accommodates misalignment between the drive shaft and the driven member while minimizing a noise associated with rotation of the driven member by the motor drive shaft.

BACKGROUND OF THE INVENTION

In many portable motor-driven devices, small direct current (DC) motors are connected to rotatably driven shafts using solid metal couplings. Such couplings typically comprise a short section of thick-walled tubing having two radially-extending threaded orifices formed in the wall of the tubing, adjacent to each end. Set screws are threaded into the orifices and are tightened to engage the drive shaft of the motor that is inserted into one end of the coupling, and to secure a driven shaft that is inserted into the other end of the coupling. Even if a fastener locking substance is applied, the set screws often loosen with use, enabling the drive shaft and/or driven shaft to slip within the coupling, causing scoring of the shafts and possible failure of the devices in which the couplings are installed, as the driven shaft will no longer be rotatably driven by the drive shaft.

Couplings are generally available from suppliers in only a limited range of sizes. If the coupling used to join two shafts is too large, it cannot properly connect the shafts and can cause vibration during rotation, because its mass is not symmetrically distributed around the center lines of the two shafts. In addition, conventional couplings generally require that the center lines of the two shafts that are joined be relatively closely aligned. Any misalignment between a motor drive shaft and a driven shaft, even if slight, is likely to cause side loading of one or both the drive shaft and driven shaft, producing increased wear of bearings or journals in which the shafts are rotatably supported. Solid couplings also transmit noise and vibration from the motor to other parts of the device in which they are used.

Ideally, it would be preferable to provide a coupling that is more tolerant of misalignment between a motor drive shaft and a driven shaft. Furthermore, such a coupling should not cause vibration of the assembly or produce noise while in operation. It will therefore be apparent that a simple coupling, which addresses the problems noted above and is relatively low in cost, would be desirable for use in small electric, motor-powered devices.

SUMMARY OF THE INVENTION

In accord with the present invention, a coupling is defined for connecting a drive shaft to a driven member. The coupling includes a hollow core nest and two elongate bodies that pass partially through a central aperture within the hollow core nest. One end of the hollow core nest has a plurality of slots formed therein that the posts engage. The posts are sized to correspond to the width of the slots. The end of each elongate body opposite that with the posts has an opening with a cross-sectional size generally corresponding to that of the drive shaft and the driven member. The openings in the elongate bodies for the drive shaft and the driven member are disposed on opposite ends of the coupler.

The central aperture of the hollow core nest is larger in cross-sectional size than that of the elongate body that passes through the central aperture, thereby enabling the coupling to accommodate radial offset and longitudinal axial misalignment between the drive shaft and the driven member. The plurality of slots have a depth which is greater than the corresponding dimension of the plurality of posts, enabling the coupling to accommodate axial movement. The coupler also includes a plurality of spring elements that provide a biasing force for ensuring that the posts of the first and second elongate bodies are positively in contact with one side of the slots of the hollow core nest, thereby substantially reducing a level of noise that would otherwise exist during rotation of the coupling. The coupler is thereby adapted to drivingly couple the drive shaft to the driven member, such that the coupler accommodates misalignment between the drive shaft and the driven member, and as a result, the coupler operates relatively noiselessly.

In one embodiment the plurality of spring elements are integral to the hollow core nest. In this embodiment, the plurality of spring elements are preferably a narrow strip of material disposed within each slot, such that each slot is separated into two sub-slots, one sub-slot being slightly smaller in size than the plurality of posts on the elongate bodies, such that when one of the plurality of posts is engaged into the slightly smaller sub-slot, said narrow strip firmly engages said post into the sub-slot, thereby reducing a noise level associated with loose fitting coupling components. This embodiment includes an end cap disposed at the end of the hollow core nest that covers the slots, preventing the posts of the elongate bodies from disengaging from the slots. Preferably, elastomeric shims are disposed in the sub-slots not engaged by the plurality of posts.

When properly assembled, the plurality of posts of the elongate body connected to the drive shaft drivingly engage the solid side of the sub-slots, and the plurality of posts of the elongate body connected to the driven member are driven by the solid sides of the sub-slots, when the drive shaft is rotated in a preferred forward direction. To aid in the proper assembly of the coupling, markings are provided on the hollow core nest and on the elongate bodies. Also, the nest preferably includes four slots, each slot having a strip that serves as the spring element, and the elongate bodies each include two posts.

In another preferred embodiment, the plurality of spring elements comprise helical coil springs, each having opposed ends that apply the biasing force between a first post on one elongate body and a second post on the other elongate body. In this embodiment, each post includes a hook that engages an end of one of the helical coil springs. The hollow core nest preferably includes a plurality of channels on its outer surface in which the plurality of spring elements are disposed.

In a preferred embodiment, the slots are disposed of at about 90° intervals around the hollow core nest. Furthermore, the posts of each elongate body are preferably disposed about 180° apart.

BRIEF DESCRIPTION OF THE DRAWING FIGURES

The foregoing aspects and many of the attendant advantages of this invention will become more readily appreciated as the same becomes better understood by reference to the following detailed description, when taken in conjunction/ with the accompanying drawings, wherein.

DESCRIPTION OF THE PREFERRED EMBODIMENT

In an exemplary initial application of the present invention, it is used for coupling a drive shaft of a small electric stepping motor to a driven shaft that is threaded and reciprocates a plunger. The plunger acts on an elastomeric membrane in a disposable cassette incorporated in a medical infusion pump, to displace fluid from a chamber formed in the cassette, forcing the fluid to flow through a line and into a patient's body. Details of this cassette infusion pump are not pertinent to the present invention and therefore are not shown or disclosed herein. It should be noted that the coupling of the present invention can be used in conjunction with almost any application in which a drive shaft needs to be coupled to a driven shaft, and thus, is not limited to the particular application disclosed herein.

Figure 1:
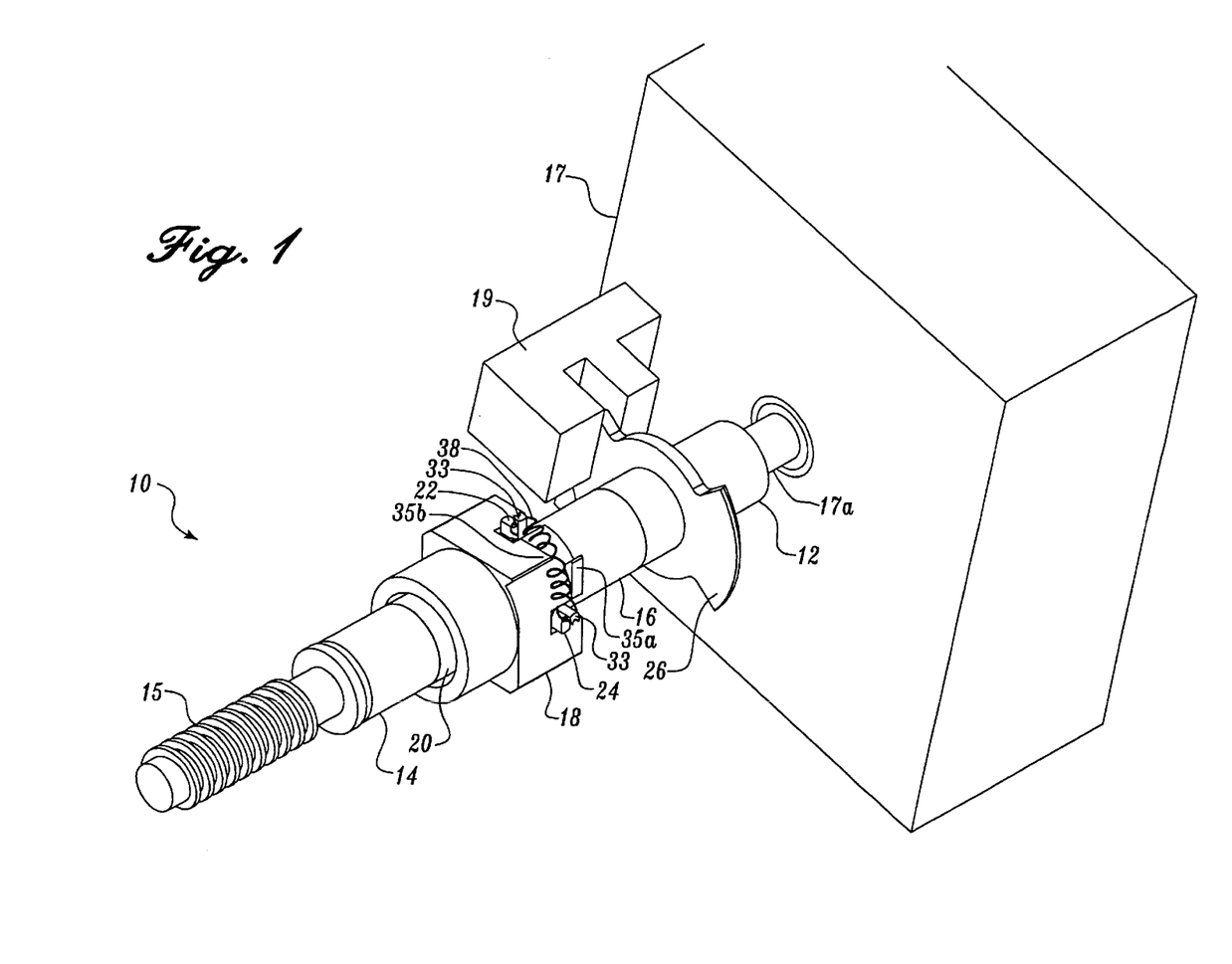
FIG. 1 is an isometric view of a first embodiment of a motor and sensor unit, and a coupling that incorporates an external spring element, in accord with the present invention.

A first embodiment of an externally sprung coupler 10 in accord with the present invention is shown in FIG. 1. An electric stepping motor 17 has a drive shaft 17a that is rotated when the electric stepping motor is energized with an electrical current. Externally sprung coupler 10 includes a drive shaft adapter 12, a drive shaft body 16, a hollow core nest 18, a driven body 20, and a driven member 14. The term "hollow core nest" as used herein and in the claims that follow is somewhat descriptive of the configuration and function performed by this member, which has a hollow or open central aperture and serves as a "nest" support for other elements of the coupler. It is anticipated that externally sprung coupler 10 can be used for many applications that do not require drive shaft adapter 12, and thus, the drive shaft adapter is considered optional. It is certainly possible for drive shaft 17a to be directly coupled to drive shaft body 16. However, drive shaft adapter 12 is useful in the exemplary application of externally sprung coupler 10 described herein. Radially extending flanges 26 of drive shaft adapter 12 are formed as flat vanes that pass through an optical sensor 19, enabling the angular position of the drive shaft to be determined, which is useful in monitoring the rotational position of the drive shaft, to enable it to be properly controlled. Those of ordinary skill in the art will readily understand that depending on the application, drive shaft adapter 12 can be provided with only a single flange, or with more than two flanges.

In the specific application illustrated, driven member 14 includes a helical screw 15 that is used for reciprocating a plunger (not shown) relative to a disposable cassette (also not shown). It should be noted that drive shaft body 16, hollow core nest 18, and driven body 20 can be used in conjunction with a different driven member.

Figure 2:
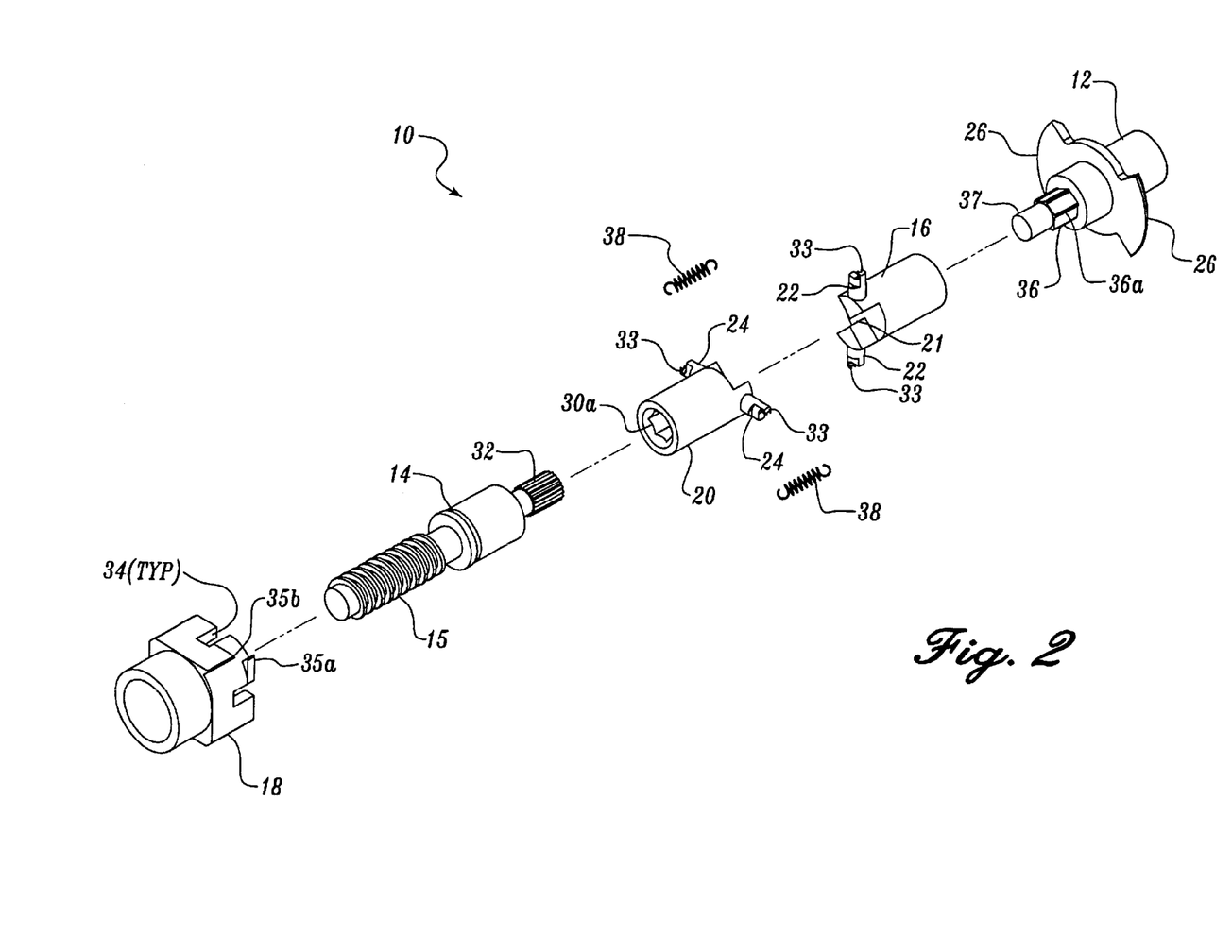
FIGS. 2 and 3 are exploded isometric views of the coupling of FIG. 1, shown from opposite ends.
Figure 3:
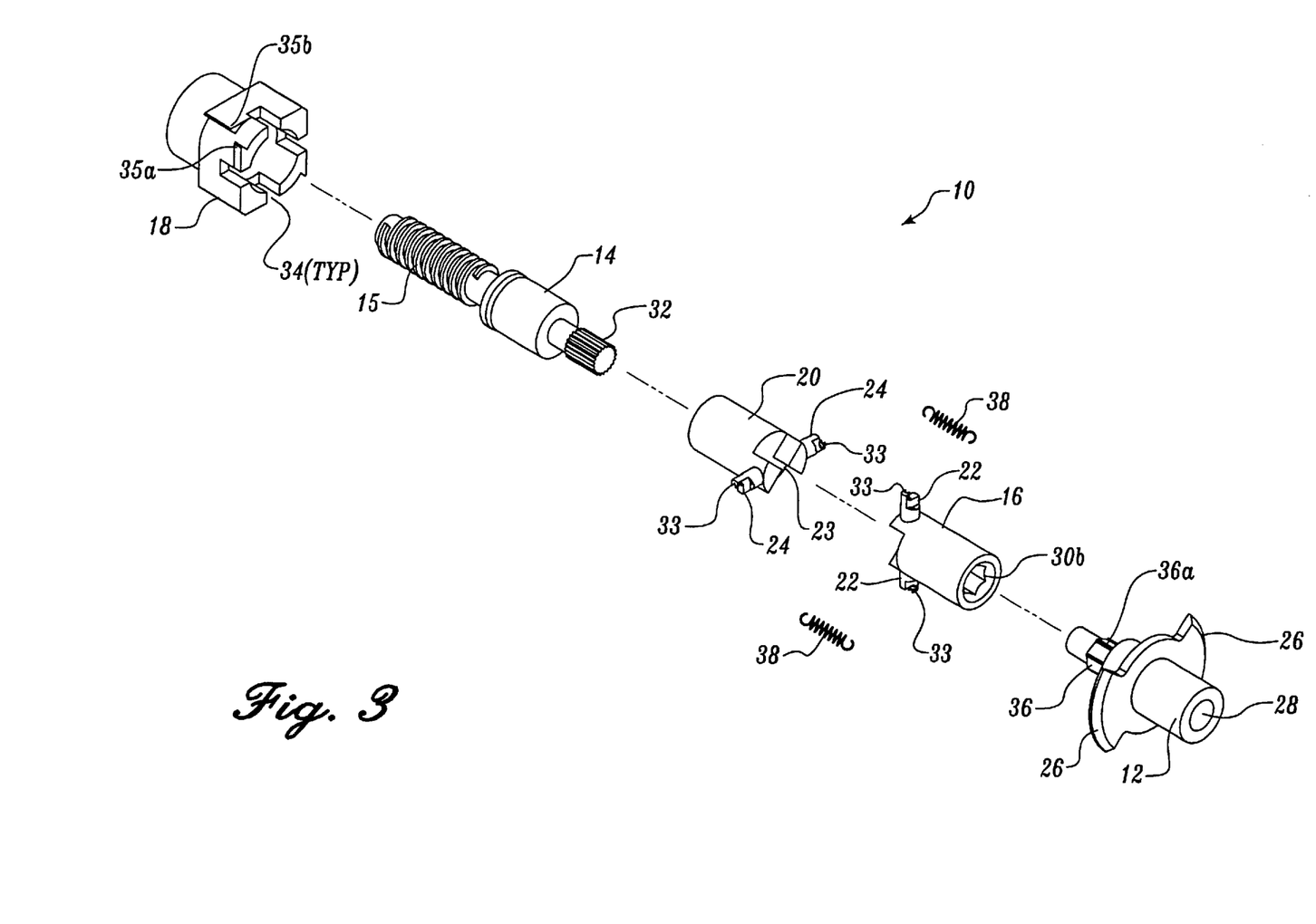

As clearly shown in FIGS. 2 and 3, drive shaft body 16 includes two drive shaft body posts 22, and driven body 20 includes two driven body posts 24, all of which are of an appropriate size to fit within four slots 34 of hollow core nest 18 (clearly shown in FIG. 3). When externally sprung coupler 10 is assembled, two coils springs 38 are mounted on the exterior of nest 18, each coil spring 38 connecting one drive shaft body post 22 to one driven body post 24. One such connection is shown in FIG. 1 (the other connection is hidden by externally sprung coupler 10). It should be noted that all drive shaft body posts 22 and driven body posts 24 include a hook 33 which the ends of coil springs 38 engage. The exterior of hollow core nest 18 is preferably curved along the path of coil springs 38, and tabs 35a and 35b, also on the exterior of hollow core nest 18, ensure that coil springs 38 remain in the correct position (one set of tabs 35a and 35b being provided for each coil spring 38).

FIGS. 2 and 3 show how the components of externally sprung coupler 10 are assembled. The hollow core of nest 18 is sufficiently large to enable driven member 14 and driven body 20 to pass through its central aperture. Driven member 14 includes a spline 32 that is press fit into a generally hexagonal-shaped opening 30a formed in driven body 20. Spline 32 forms an interference fit when forced into opening 30a. Opening 30a is hexagonal shaped near the exterior of the opening, and cylindrical shaped, with a smaller diameter, further within the opening, as evident in FIGS. 5 and 6. Spline 32 is of a size such that spline 32 passes freely through the hexagonal shaped portion of opening 30a, and forms an interference fit in the smaller cylindrical portion. It should be noted that spline 32 and opening 30a can alternatively be configured in other shapes, as will be understood by those of ordinary skill in the art.

Drive shaft body 16 includes a notch 21, which is clearly seen in FIG. 2, and driven body 20 includes a corresponding notch 23, which is clearly seen in FIG. 3. When properly assembled, notches 21 and 23 engage to ensure that the two drive shaft body posts 22 and two driven body posts 24 each fit into a unique slot 34 of hollow core nest 18.

In this preferred embodiment, drive shaft adapter 12 incorporates a hexagonal shaft 36 that terminates in a smaller diameter cylindrical shaft 37, both of which are sized to fit within an opening 30b in drive shaft body 16. Opening 30b is clearly seen in FIG. 3.. Cylindrical shaft 37 is sized to fit freely into the corresponding cylindrical section of opening 30b. Hexagonal shaft 36 includes ridges 36a, one ridge per face of hexagonal shaft 36. Ridges 36a are preferably located at each vertex, though ridges 36a can also be located on the center of each face. In the preferred embodiment ridges 36a are on the order of 5/1000 of an inch in height. The purpose of ridges 36a is to form an interference fit between hexagonal shaft 37 and the hexagonal section of opening 30b, and thus to more securely attach drive shaft adapter 12 to drive shaft body 16. Those of ordinary skill in the art will readily understand that the location and dimensions of ridges 36a can be modified while still enabling a secure attachment to be achieved.

It should be noted that drive shaft body 16 and driven member body 20 are preferably identical, which both reduces manufacturing costs and facilitates assembly of externally sprung coupler 10. Thus, drive shaft body posts 22 and driven body posts 24 are identical in configuration, as are openings 30a and 30b. Only after the externally sprung coupler is assembled can driven body 20 and drive shaft body 16 be distinguished, based on their positions relative to drive shaft 17a and driven member 14.

Drive shaft adapter 12 also includes an opening 28, clearly visible in FIG. 3. Opening 28 is of a size and shape that generally corresponds to the size and shape of drive shaft 17a and can vary depending on the corresponding size and shape of the drive shaft of the particular motor selected.

Figure 4:
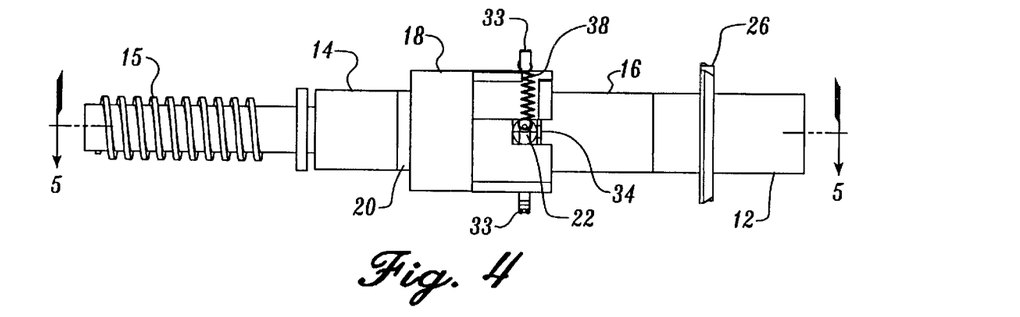
FIG. 4 is a side elevational view of the of the coupling of FIG. 1.

When externally sprung coupler 10 is fully assembled, driven member 14 passes completely through hollow nest 18. Driven member body 20 passes part way through hollow core nest 18, further advancement being precluded when driven body posts 24 seat within slots 34 of hollow core nest 18. Once driven member 14 and driven body 20 are thus assembled, drive shaft body 16 is positioned such that notch 21 of drive shaft body 6 meshes with corresponding notch 23 of driven member body 20. Drive shaft body posts 22 are inserted into the final two slots 34 of hollow core nest 18. When assembled, each of slots 34 of hollow core nest 18 has either a drive shaft body post 22 or a driven body post 24 seated within it. Coil springs 38 are engaged onto hooks 33 such that each coil spring 38 connects one drive shaft body post 22 to one driven body post 24. It should be noted that the fit between notch 21 and notch 23 is such that drive shaft body 16 and driven member body 20 can move relative to each other, enabling the assembled coupler to flex in a manner not possible with a solid coupler. FIG. 4 illustrates externally sprung coupler 10 fully assembled, with the driven shaft and drive shaft aligned along a common longitudinal axis. Driven member 14 and driven body 20 are joined together with an interference fit and do not move relative to each other. Similarly, drive shaft body 16 and drive shaft adapter 12 are joined together with an interference fit and do not move relative to each other. In contrast, driven body 20 and drive shaft body 16 can move out of longitudinal axial alignment relative to each other, as well as relative to hollow core nest 18. Furthermore, the depth of the slots in the hollow core nest permits axial movement of the drive shaft and/or of the driven member relative to the hollow core nest. This freedom of movement enables externally sprung coupler 10 to drivingly couple a drive shaft to a driven member when the drive shaft and driven member are not in longitudinal axial alignment. Coil springs 38 insure that a force is applied that biases drive shaft body 16 and driven member body 20 in contact with hollow core 18, so that noise is not created by loose fitting components when externally sprung coupler 10 is used to transfer force from the drive shaft to the driven member. It should be noted that in an exemplary application the present invention will be used with a stepping motor. The constant starting and stopping of a stepping motor can cause noise when components of a coupler move relative to one another. Coil springs 38 minimize such noise.

Figure 5:
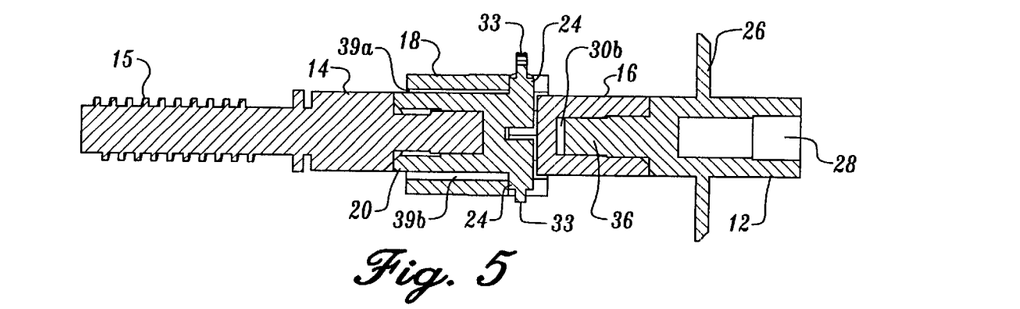
FIG. 5 is cross-sectional view of the coupling of FIG. 4 taken along section line 5—5 in FIG. 4.

FIG. 5 shows a cross-sectional view of externally sprung coupler 10 in which the interference fit of spline 32 of driven member 14 into opening 30a of driven body 20 can be clearly seen. It can also be clearly seen that hollow core nest 18 is larger in diameter than either driven body 20 or drive shaft body 16. The interference fit of hexagonal shaft 36 and cylindrical shaft 37 of drive shaft adapter 12 with opening 30b of drive shaft body 16 are clearly evident in this Figure. It is also apparent that driven body posts 24 can move radially relative to their corresponding slots 34 in hollow core nest 18, by at least a small amount. Driven body 20 (and thus, driven body posts 24) is free to move downward relative to hollow core nest 18 until an upper gap 39a is eliminated (correspondingly increasing the size of a lower gap 39b). Drive shaft body 16 is also able to move radially in a similar manner relative to hollow core nest 18. This radial accommodation enables externally sprung coupler 10 to adjust to a misalignment offset between the longitudinal axes of the drive shaft and the driven member.

Figure 6:
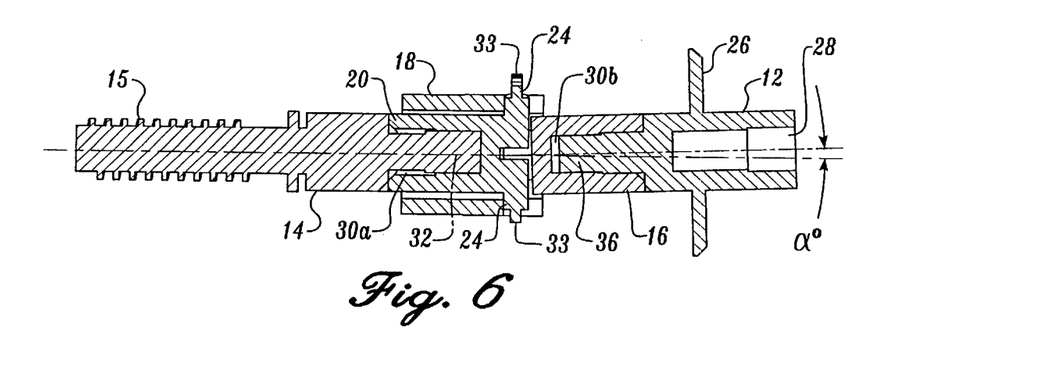
FIG. 6 replicates the cross section view of FIG. 5, but illustrates the body of the coupling misaligned relative to a longitudinal axis of the rest of the coupling.

FIG. 6 illustrates another type of misalignment of drive shaft body 16 relative to hollow core nest 18. As illustrated, the end of drive shaft body 16 is deflected upwardly by $\alpha°$ relative to the longitudinal axis of hollow core nest 18. It should be noted that drive shaft body 16 could be deflected in a downwardly direction as well. Similarly (although not shown), driven member body 20 can be deflected relative to the longitudinal axis of hollow core nest 18 by a similar degree, both toward the viewer of FIG. 6, as well as away from the viewer. The combination of these accommodations for radial and longitudinal axial movement of drive shaft body 16 and driven body 20 enable externally sprung coupler 10 to drivingly couple a drive shaft to a driven member when there is considerable misalignment and/or offset between the longitudinal axes of the drive shaft and the driven member.

Figure 7:
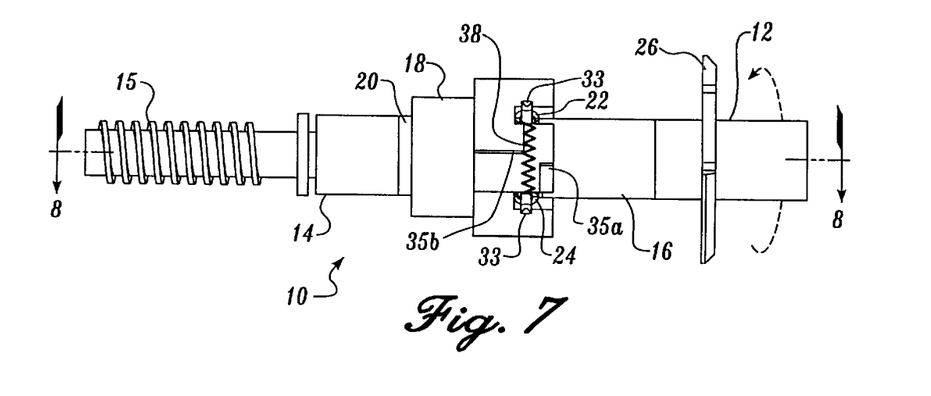
FIG. 7 is a side elevational view of the of the first embodiment of the coupling, rotated approximately 45° from the orientation of the side elevational view of the of the coupling shown in FIG. 4.
Figure 8:
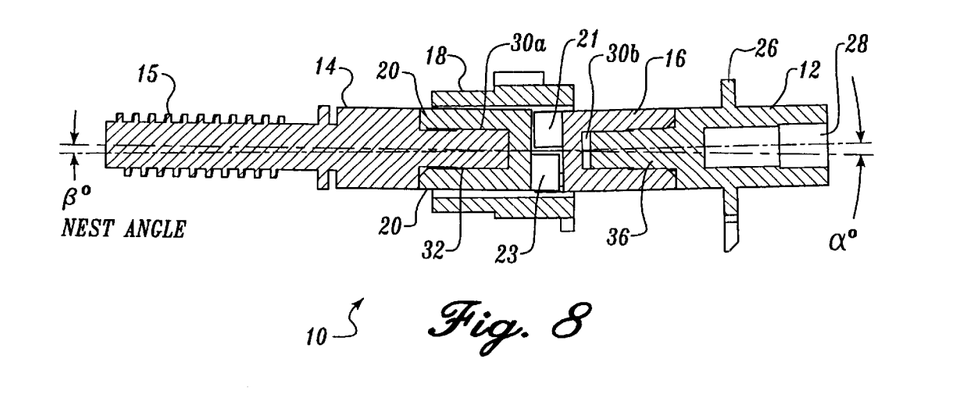
FIG. 8 is a cross-sectional view of the coupling taken along section line 8—8 of FIG. 7, illustrating both bodies of the coupling misaligned relative to a longitudinal axis of a nest of the coupling.

FIG. 7 is another view of externally sprung coupler 10, in which externally sprung coupler 10 has been rotated approximately 45° from the position illustrated in FIGS. 4, 5, and 6. In this position, only one driven body post 24 and one drive shaft body post 22 can be seen. When externally sprung coupler 10 is properly assembled, hooks 33 face away from the path of coil spring 38. Preferably, as in FIG. 5, hook 33 of drive shaft body post 22 faces away from driven body post 24, and the corresponding hook of driven body post 24 faces away from drive shaft body post 22. This configuration provides a secure attachment for coil spring 38. FIG. 8 is a cross-sectional view that illustrates both drive shaft body 16 and driven body 20 being deflected from longitudinal axial alignment relative to hollow core nest 18 through angles of $\alpha°$ and $\beta°$, respectively.

Figure 9:
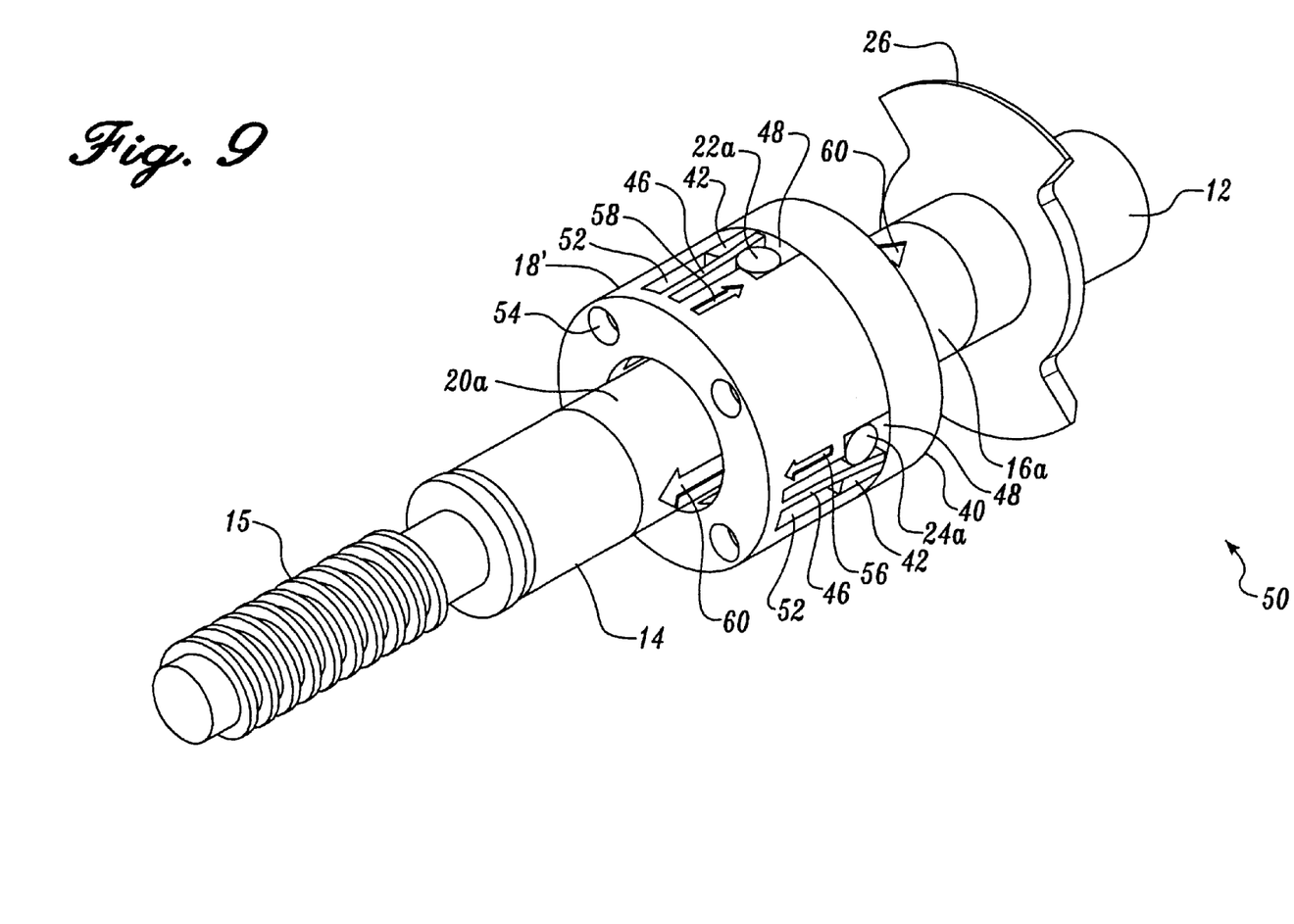
FIG. 9 is an isometric view of a second embodiment of a coupling in accord with the present invention, incorporating an integral spring element.

FIGS. 9–15B illustrate an internally sprung coupler 50, which is a second preferred embodiment of the present invention. Internally sprung coupler 50 includes a hollow core nest 18', a drive shaft body 16a, and a driven member body 20a. Also shown in FIG. 9 is drive shaft adapter 12 and driven member 14. It should be understood that internally sprung coupler 50 could be used in association with a different type of driven member 14 as well as a different type of drive shaft adapter 12 (or with no drive shaft adapter). Drive shaft body post 22a and driven body post 24a are different than the corresponding posts of the externally sprung coupler in that the posts of the internally sprung coupler do not incorporate hook 33. Preferably, both drive shaft body 16a and driven body 20a include a body orientation directional arrow 60 that is molded therein or otherwise applied, e.g., by the use of ink or other marking substance. Directional arrow 60 extends parallel to the longitudinal axis of the bodies and points away from the end of the body that incorporates the posts. The purpose of directional arrow 60 is to aid in the assembly of internally sprung coupler 50, as will be explained below. Absent directional arrows 60 on the bodies (and corresponding directional arrows 56 and 58 on hollow core nest 18'), one might incorrectly assemble internally sprung coupler 50.

Hollow core nest 18' includes four fastener holes 54. Fastener holes 54 are used to secure an end cap 40 to the hollow core nest. The purpose of end cap 40 is to insure that drive shaft body posts 22a and driven body posts 24a do not become disengaged from the corresponding slots 48 in hollow core nest 18'. This concern does not arise with respect to externally sprung coupler 10, because external coil springs 38 of externally sprung coupler 10 prevent that from occurring. Hollow core nest 18' of internally sprung coupler 50 includes four slots; however as described below, these slots have been significantly modified in internally sprung coupler 50 compared to the slot in externally sprung coupler 10. The slots of internally sprung coupler 50 incorporate a leaf spring 46, which separates each of the slots into two distinct sub-slots, including a sub-slot 48 into which drive shaft body posts 22a and driven body posts 24a are inserted, and a shim sub-slot 52. An elastomeric shim 42 is disposed in each shim sub-slot 52.

Hollow core nest 18' also includes assembly direction arrows, including an "away from end cap" directional arrow 56 and a "toward end cap" directional arrow 58. While FIG. 9 illustrates only one directional arrow 56 and one arrow 58, it should be understood that a second directional arrow 56 is located on hollow core nest 18', approximately 180° from the position of the first directional arrow 56. Similarly, a second directional arrow 58 is located approximately 180° from the position of directional arrow 58 shown in FIG. 9. The purpose of these directional arrows will be described more fully below; however as noted above, the purpose of the directional arrows on both hollow core nest 18' and bodies 16a and 20a is to ensure that internally sprung coupler 50 is correctly assembled. Unlike externally sprung coupler 10, internally sprung coupler 50 can be assembled in a less desirable configuration that significantly reduces the functionality of the coupler. When assembling externally sprung coupler 10, hooks 33 provide assembly directional clues as to the preferred orientation and configuration.

As internally sprung coupler 50 is assembled, the orientation of the directional arrows 60 are matched to that of directional arrows 56 and 58 on hollow core nest 18'. For example, in FIG. 10, driven body 20a is positioned such that driven body posts 24a are inserted into slots 48 in hollow core nest 18', adjacent to directional arrows 56. If driven body 20a were rotated by 900 about its longitudinal axis (similar to drive shaft body 16a), then driven body posts 24a would engage slots 48 that are adjacent directional arrows 58. As directional arrows 58 are opposed to directional arrow 60 on driven body 20a, it will be immediately apparent that the wrong orientation has occurred during assembly.

Figure 10:
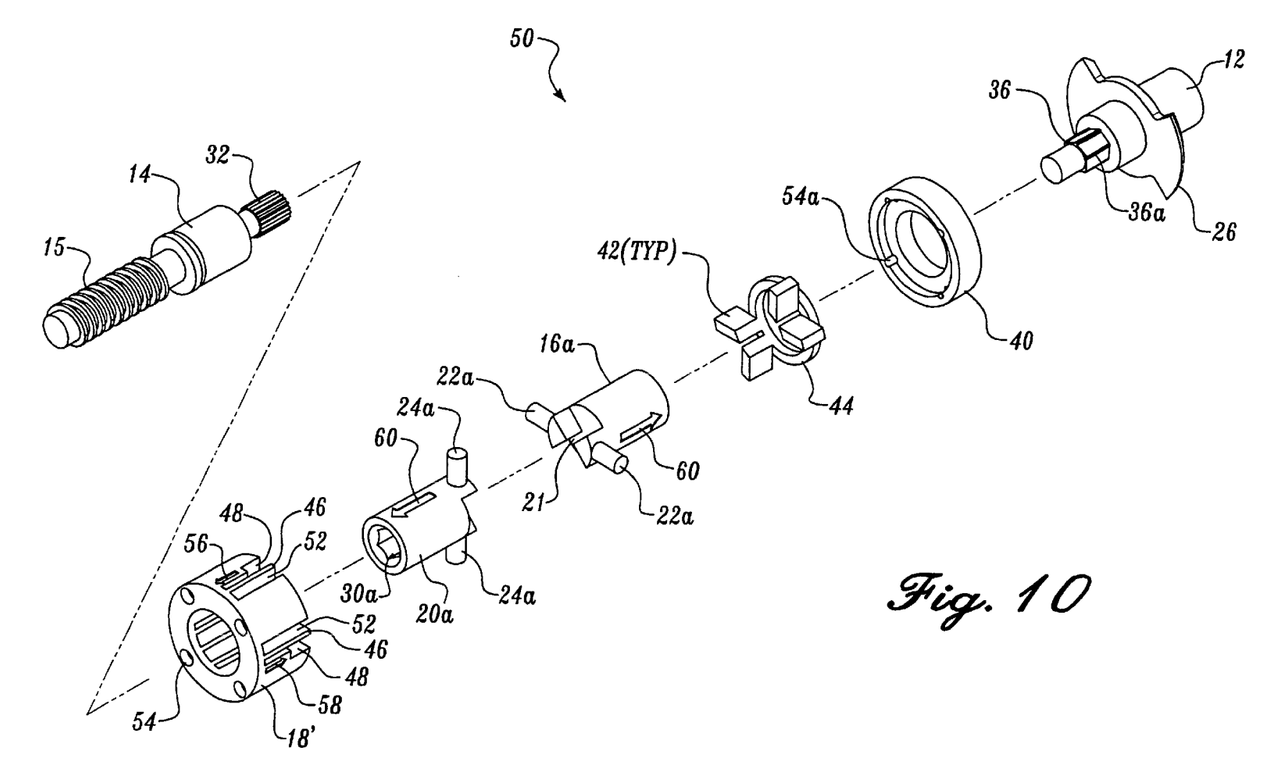
FIGS. 10 and 11 are exploded isometric views of the coupling of FIG. 9, from opposite ends of the coupling.
Figure 11:
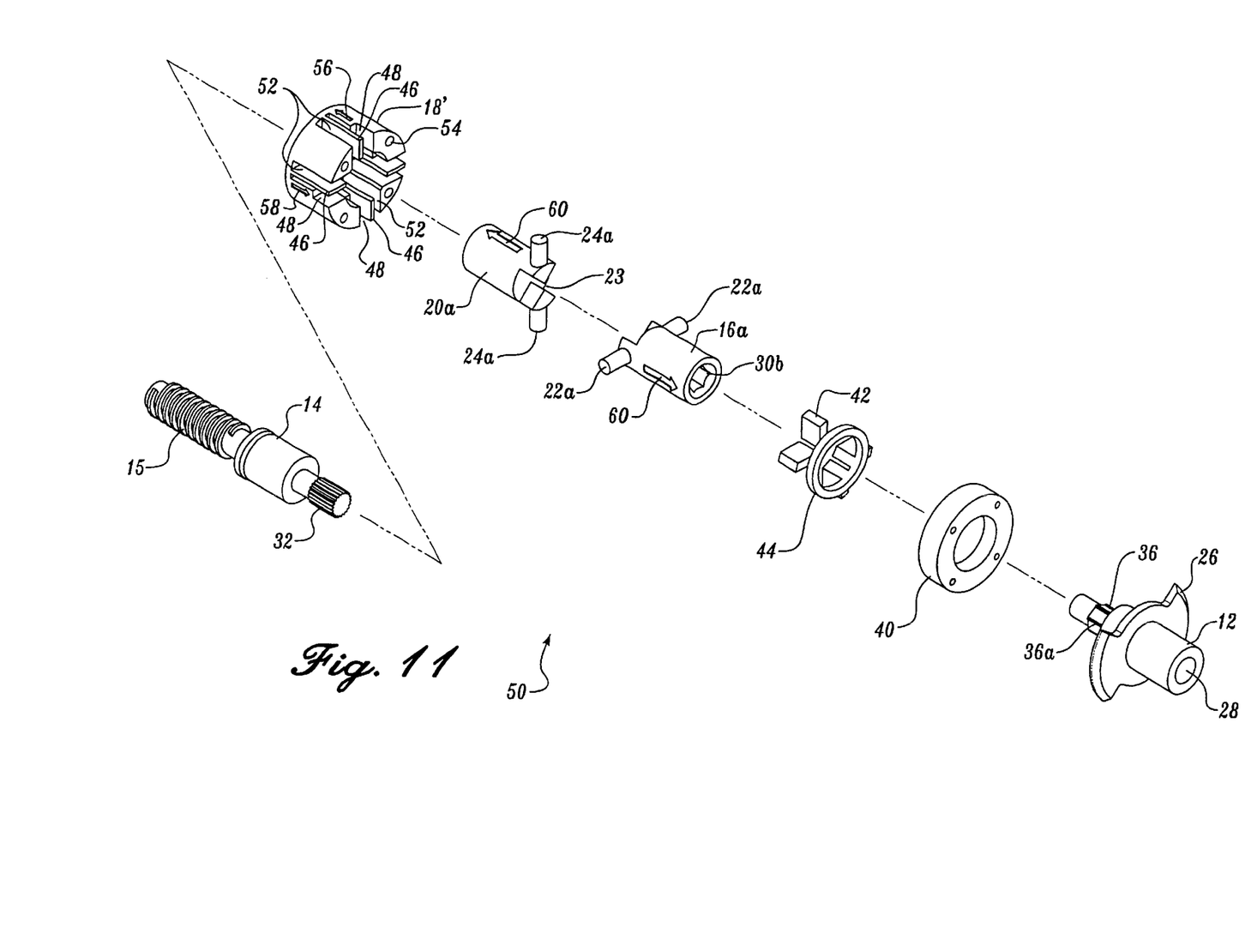

FIGS. 10 and 11 provide an exploded view of internally sprung coupler 50. As illustrated, each shim 42 is connected to a shim support structure 44, which is preferable, as it aids in the assembly of the internally sprung coupler 50, because each individual shim does not need to be separately placed. Support structure 44 fits into a groove in end cap 40. Fasteners pass through fastener holes 54 to connect hollow core nest 18' with end cap 40. Preferably, the type of fasteners used will be removable so that internally sprung coupler 50 may be disassembled when desired. End cap 40 prevents shim support structure 44 (and thus shims 42), drive shaft body 16a, and driven body 20a, from being disconnected from hollow core nest 18'. Drive shaft body 16 includes a notch 21, and driven body 20 includes a corresponding notch 23.

Figure 12:
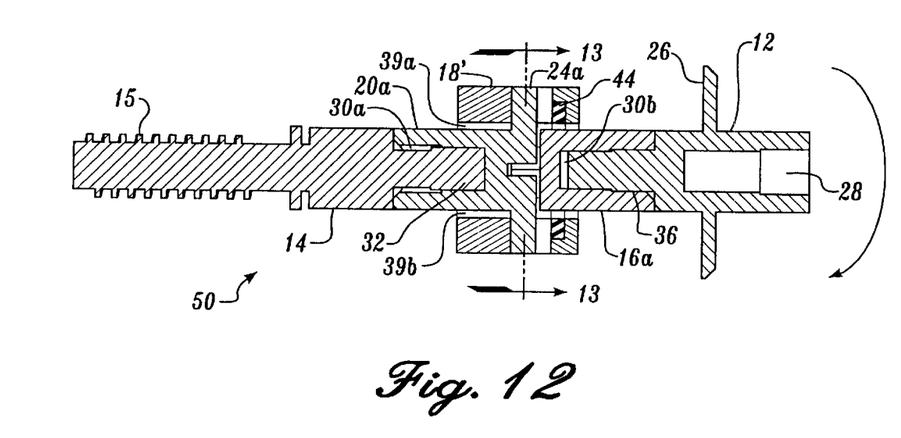
FIG. 12 is a cross-sectional, side elevational view of the second embodiment of the coupling.

FIG. 12 is a cross-sectional view of internally sprung coupler 50 as it appears when fully assembled. The accommodation for movement and both longitudinal axial misalignment and radial offset provided for drive shaft body 16a and driven body 20a relative to hollow core nest 18' is quite similar to that provided by externally sprung coupler 10. To accommodate an offset, driven body 20a can move radially upwardly and downwardly with respect to hollow core nest 18', and drive shaft body 16a can move in a similar manner inwardly and outwardly, in regards to the view in FIG. 12. Both drive shaft body 16a and driven body 20a can move through an angular misalignment relative to the longitudinal axis of hollow core nest 18', generally as described above, with respect to externally sprung coupler 10. The only significant difference is that if externally sprung coupler 10 were subject to severe angular distortion, coil springs 38 might become detached from hooks 33, in which case, the coupler would likely come apart. In contrast, if internally sprung coupler 50 were subjected to a similarly severe angular misalignment, end cap 40 prevents the coupler from coming apart. As the loading caused by longitudinal angular misalignment increases excessively, it is likely that one of the drive shaft body posts 22a or driven body posts 24a would fail.

Figure 13:
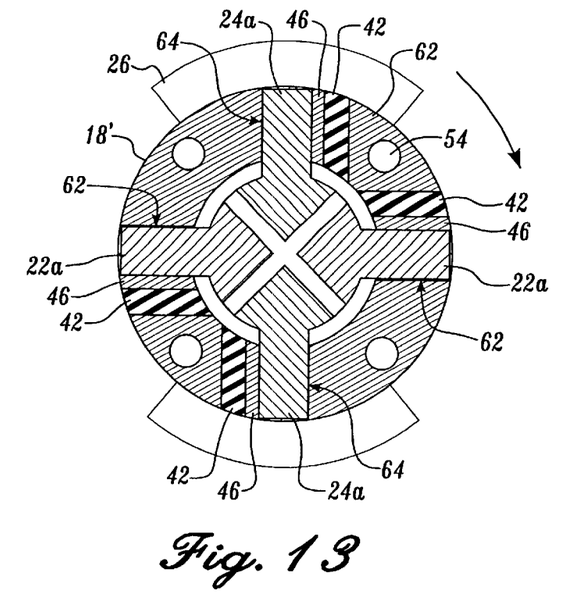
FIG. 13 is a cross-sectional view of the coupling taken along section line 13—13 in FIG. 12, illustrating the relative positions of the slots within the nest of the coupling, the body posts, and the shims.

FIG. 13 is a cross-sectional view that shows how drive shaft body post 22a, driven body post 24a, and shims 42 fit into the slots of hollow core nest 18'. When used in a cassette infusion pump, the motor, by convention, will turn in a clockwise direction as viewed from the outward extending end of the drive shaft. Before assembling internally sprung coupler 50, it is important to know the rotational direction of the motor with which the coupler is to be used. The directional arrows (56, 58, and 60) shown in the Figures previously discussed are based on a drive shaft rotation in the clockwise direction, when the drive shaft is rotating in its normal forward direction (as opposed to being run in reverse). In FIG. 13, drive shaft body posts 22a engage solid surfaces 62 when rotated in a clockwise direction by a driveshaft. If the rotational force were applied in the counterclockwise direction, drive shaft body posts 22a would be applying force to leaf springs 46, not to solid surfaces 62, which is undesirable, because a small amount of compliance (determined by the elastic properties of leaf springs 46 and shim material 42) would occur. It is preferred that as drive shaft body 16a is rotated by the drive shaft in the clockwise direction, drive shaft body posts 22a apply force against solid surface 62 of hollow core nest 18', thereby providing a positive contact and eliminating any compliance.

When hollow core nest 18' is caused to rotate in the clockwise direction due to the force exerted on solid surface 62 by drive shaft body posts 22a, hollow ore nest 18' in turn, exerts a force on driven body posts 24a via solid surface 64. The purposes of directional arrows 56, 58, and 60 are to insure that the coupler is assembled correctly relative to this rotational direction. If internally sprung coupler 50 were assembled incorrectly, drive shaft body posts 22a apply force to leaf springs 46 rather than solid surfaces 62, which will also occur if the clockwise rotating motor is reversed. For the application of internally sprung coupler 50 to a disposable cassette pump, it is preferable that the coupler provide no compliance in the forward direction. Thus, care must be exercised to ensure that internally sprung coupler 50 is assembled in consideration of the motor normal rotational direction and the requirements of the particular application in which the coupler is used.

Figure 14:
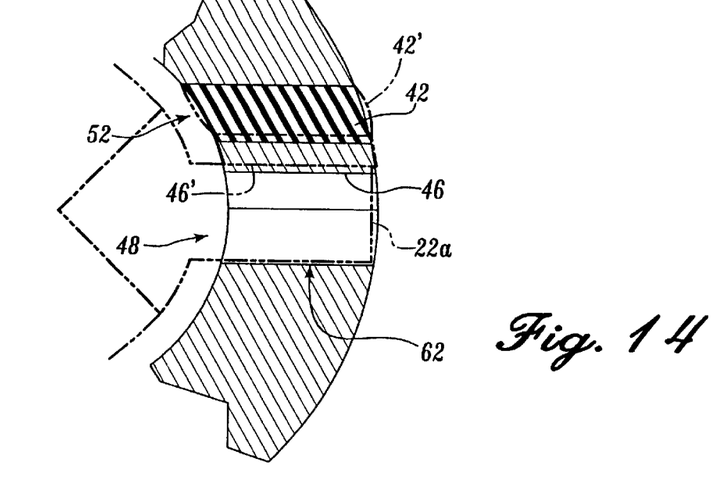
FIG. 14 is an enlargement of a portion of FIG. 13, illustrating how the insertion of a body post into a slot of the hollow core nest deflects an integral spring element.

FIG. 14 illustrates further details showing how leaf spring 46 operates as an "internal spring" and positively engages drive shaft body posts 22a when these posts are inserted within slots 48. As is clear from FIG. 14, slots 48 are just slightly smaller than drive shaft body posts 22a and driven body posts 24a. When one of posts 22a (or posts 24a) are inserted into any of slots 48, leaf spring 46 is deflected slightly away from that post. Leaf springs 46 thus each positively engage the post within the slot. Shims 42 add additional resiliency to leaf springs 46. In FIG. 14, drive shaft body post 22a is inserted into slot 48, and leaf spring 46 is deflected to a new position 46'. This deflection causes shim 42 to compress to a new position 42'. The elasticity of this "internal spring" can be adjusted by changing the material used for shim 42 to provide a different elasticity, or by increasing or decreasing the thickness of leaf spring 46. Preferably, leaf spring 46 is deflected by about 0.011" when the post is inserted into slot 48.

Figure 15A:
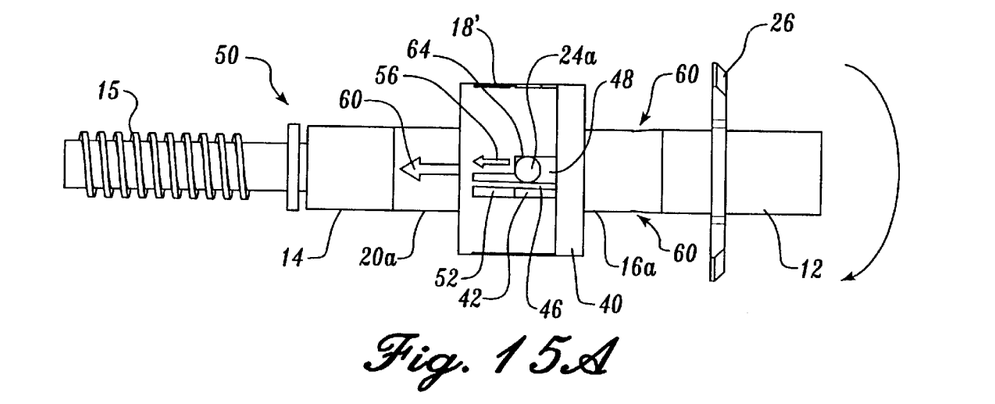
FIGS. 15A and 15B are side elevational views of the second embodiment of the coupling, illustrating the coupling attached to the drive shaft and the driven shaft.
Figure 15B:
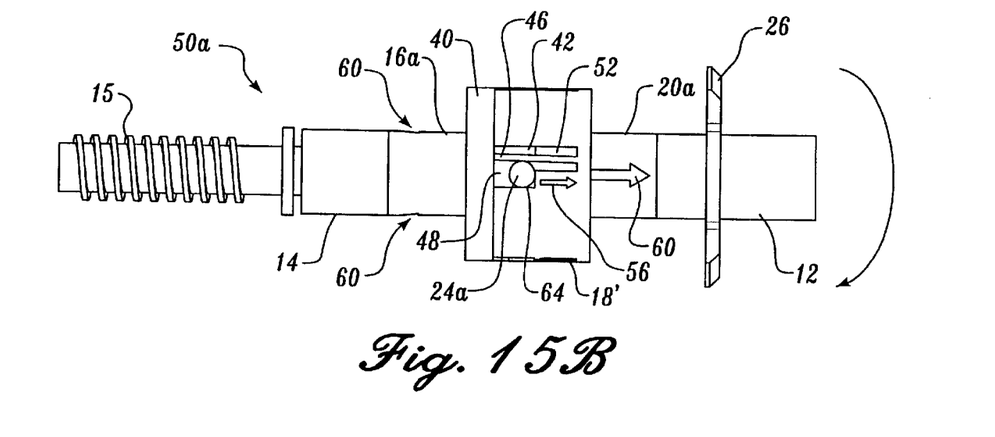

FIGS. 15A and 15B illustrate that if directional arrows 56, 58, and 60 are used to ensure the correct assembly of the two bodies and to ensure that hollow core nest 18' is in the proper orientation, it does not matter in which orientation assembled internally sprung coupler 50 is positioned before drive shaft adapter 12 (or only the drive shaft, if no adapter and flange are required) and driven member 14 are attached to the coupler. In FIG. 15A, end cap 40 is disposed adjacent to drive shaft adapter 12. Internally sprung coupler 50 has been assembled and attached to driven member 14 and drive shaft adapter 12 as shown in the exploded views of FIGS. 10 and 11. When a drive shaft rotates in a clockwise direction, drive shaft body posts 22a will apply a force to solid surfaces 62 (FIG. 13), causing hollow core nest 18' to rotate in a clockwise direction, further causing solid surfaces 64 to apply a force to driven body posts 24a.

In FIG. 15B, an internally sprung coupler 50a that has been properly assembled, by correctly following the indication of directional arrows 56, 58, and 60 is attached to driven member 14 with the driven member disposed adjacent to end cap 40, which is opposite to the attachment of driven member 14 to internally sprung coupler 50 in FIG. 15A. Thus in internally sprung coupler 50a, driven body 20a is not attached to driven member 14, but instead, to drive shaft adapter 12. A clockwise rotation of the drive shaft attached to internally sprung coupler 50a causes driven body posts 24a to apply a force to solid surface 64, thus causing hollow core nest to rotate. In each situation as shown in FIGS. 15A and 15B, the rotational force is transferred to a solid surface between the driven body post 24 and hollow core nest 18. If the rotational of the motor is reversed, i.e., to a counterclockwise direction, then the rotational force transferred between driven body post 24a and hollow core nest 18 is via leaf spring 46, rather than solid surface 64, which results in a small amount of compliance. Such compliance, even to this limited extent, is undesirable in the application of the coupler to a cassette infusion pump when the motor is used to displace fluid, but is not so significant when retracting a plunger. Thus, the orientation of assembly directional arrows 56, 58, and 60 are a function of the normal "forward" rotational direction of the motor selected. Furthermore, as mentioned above with respect to the bodies of the first embodiment, in internally sprung coupler 50 (or 50a), the bodies of the internally sprung coupler are identical and interchangeable, which facilitates production and assembly of the coupler.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A coupling for connecting a drive shaft to a driven member, comprising:
   (a) a hollow core nest having a central aperture and opposed first and second ends, the second end including a plurality of generally longitudinally extending slots;
   (b) a first elongate body having opposed first and second ends, an opening being disposed at the first end thereof, said opening being adapted to receive the drive shaft and to be rotatably driven thereby, a plurality of posts being disposed on said second end of the first elongate body, said plurality of posts having a cross-sectional size generally corresponding to a width of at least a first portion of the plurality of the slots, said first elongate body being disposed so that a longitudinal axis thereof passes through the central aperture of the hollow core nest, the plurality of the posts of said first elongate body engaging the first portion of the plurality of the slots; and
   (c) a second elongate body having opposed first and second ends, and an opening disposed at the first end thereof, said opening being adapted to receive the driven member and to rotatingly drive it, a plurality of posts being disposed on said second end of the second elongate body, said plurality of posts having a cross-sectional size generally corresponding to a width of at least a second portion of the plurality of the slots, said second elongate body being disposed so that a longitudinal axis thereof passes through the central aperture of the hollow core nest and such that the plurality of the posts of said second elongate body engage the second portion of the plurality of the slots, said first elongate body being thereby adapted to transmit a rotational motion from the drive shaft through the hollow core nest, to the second elongate member, and thus, to the driven member, while accommodating misalignment between the drive shaft and the driven member.

2. The coupling of claim 1, wherein the first elongate body and the second elongate body are identical and interchangeable.

3. The coupling of claim 1, wherein both the first elongate body and the second elongate body are sized such that both can pass through the central aperture of the hollow core nest without touching an interior surface of the central aperture, thus enabling the coupling to accommodate substantial radial misalignment between longitudinal axes of the drive shaft, the driven member, and the hollow core nest.

4. The coupling of claim 1, wherein the substantial misalignment between the drive shaft and the driven member is between the longitudinal axis of the hollow core nest and the longitudinal axis of at least one of the drive shaft and the driven member.

5. The coupling of claim 1, wherein the plurality of slots have a depth which is greater than a corresponding dimension of the plurality of the posts of said first and second elongate body, enabling the coupling to accommodate axial movement between the hollow core nest and at least one of the drive shaft and the driven member.

6. The coupling of claim 1, further comprising a plurality of spring elements that provide a biasing force to ensure that the post of the first and second elongated bodies are positively engaged in the slots of the nest, thereby reducing a level of an audible noise that would otherwise exist as the hollow core nest is rotated.

7. The coupling of claim 6, wherein the plurality of spring elements are integral to the hollow core nest.

8. The coupling of claim 7, further comprising an end cap disposed at the second end of the hollow core nest that covers the slots and prevents the plurality of the posts of the first elongate body and the second elongate body from disengaging from the slots.

9. The coupling of claim 8, wherein the plurality of the spring elements comprise a strip of material disposed within each slot that separates the slot into a first sub-slot and a second sub-slot, the first sub-slot having a solid side, and a spring side defined by the strip of material, said first sub-slot being smaller in size than the plurality of the post on said first and second elongate bodies, such that when one of the plurality of the posts is engaged in said first sub-slot, said strip firmly engages said post in said first sub-slot, thereby substantially reducing a level of an audible noise that would otherwise exist as the hollow core nest is rotated.

10. The coupling of claim 9, further comprising a plurality of shims disposed in the second sub-slots so as to limit an amount of deflection of the strip of material in each of the plurality of slots, thereby substantially reducing a level of an audible noise level that would otherwise exist as the hollow core nest is rotated.

11. The coupling of claim 10, wherein the plurality of the shims are formed of an elastomeric material.

12. The coupling of claim 11, wherein the plurality of shims are joined together in an integral unit.

13. The coupling of claim 9, wherein the coupling is assembled such that the plurality of posts of said first elongate body drivingly engage said solid side of the first sub-slots, and the plurality of the posts of said second elongate body are adapted to be rotatingly driven by said solid side of the first sub-slots, when the drive shaft is rotated in a preferred forward direction.

14. The coupling of claim 13, further comprising markings disposed on the hollow core nest and the first and second elongate bodies to aid assembling the coupling by ensuring that when the drive shaft is rotated in a preferred forward direction, the plurality of the posts of said first elongate body drivingly engage said solid side of the first sub-slots, and the plurality of posts of said second elongate body are driven by said solid side of the first sub-slots.

15. The coupling of claim 14, wherein the plurality of slots formed in the hollow core nest are at least four in number, and wherein the first and the second elongate bodies each include at least two posts.

16. The coupling of claim 6, wherein the plurality of spring elements each comprise helical coil springs having a first end and a second end, said first end being coupled to a first post on the first elongate body and said second end being coupled to a second post on the second elongate body to apply the biasing force between the first and the second post.

17. The coupling of claim 16, wherein each of the plurality of the posts includes a hook that is connected to one of the first end and the second end of each of the plurality of helical coil springs.

18. The coupling of claim 16, wherein and exterior surface of the hollow core nest includes a plurality of channels within each of which, one of the plurality of helical coil springs is disposed.

19. The coupling of claim 18, wherein the plurality of the channels extend circumferentially around the exterior surface of the hollow core nest.

20. The coupling of claim 1, wherein the plurality of slots comprise four slots disposed about 90° apart around the hollow core nest.

21. The coupling of claim 20, wherein the plurality of the posts on each the first and second elongate bodies comprise two posts disposed about 180° apart.

22. The coupling of claim 1, wherein the driven member is threaded.

23. The coupling of claim 1, wherein the driven member comprises an elongate shaft having a helical screw disposed adjacent to one end and a spline disposed adjacent to an opposite end.

24. The coupling of claim 23, wherein the spline forms an interference fit with the opening in the second elongate body.

25. The coupling of claim 1, wherein the opening in the first elongate body is not circular in cross section.

26. The coupling of claim 1, wherein the hollow core nest, the first elongate body, and the second elongate body are each formed of a plastic.

27. The coupling of claim 1, further comprising a flanged member having a first end and a second end, and a flange extending radially outward therefrom, said first end having an opening adapted to couple with the drive shaft, said second end having a shaft adapted to couple with the opening in said first elongate body, the flange of said flanged member being provided to enable a rotational position of the drive shaft to be determined with an optical sensor.

28. A torsionally rigid coupling assembly for transmitting a rotational drive force from a drive shaft to a driven member, comprising:
   (a) a hollow core nest having a central aperture, a first end, and a second end, a plurality of slots being disposed at the first end of the hollow core nest;
   (b) two generally elongate bodies, each having a first end, a second end, and an opening at the first end that is sized to couple with one of the drive shaft and the driven member, and each having a plurality of posts extending radially outward adjacent to the second end, said plurality of the posts being sized to slidably engage the slots in the hollow core nest; and
   (c) one of the elongate bodies passing through the central aperture of the hollow core nest and having its opening disposed at the first end of the hollow core nest, and the other elongate body having its opening disposed at the second end of the hollow core nest, each of the plurality of the post of the elongate bodies engaging a different slot in the hollow core nest, said engagement of the plurality of posts within the plurality of the slots of the hollow core nest permitting a substantial misalignment between the elongate bodies and the hollow core nest while transmitting the rotational drive force between the drive shaft and the driven member.

29. The torsionally rigid coupling of claim 28, wherein the central aperture of the hollow core nest is larger in cross-sectional dimension than that of the elongate bodies, such that the coupling accommodates a radial offset between a longitudinal axis of the drive shaft and a longitudinal axis of the driven member.

30. The torsionally rigid coupling of claim 28, wherein said openings of the elongate bodies are non-circular in shape and are sized to produce an interference fit to couple with at least one of the drive shaft and the driven member.

31. The torsionally rigid coupling of claim 28, wherein the coupling further comprises at least one spring element providing a biasing force that ensures a positive contact between the plurality of posts and the plurality of slots, thereby substantially reducing a noise level that would otherwise exist during rotation of the coupling.

32. The torsionally rigid coupling of claim 31, wherein said at least one spring element is integrally formed on the hollow core nest.

33. The torsionally rigid coupling of claim 31, wherein the at least one spring element comprises a flexible strip of material disposed in each of the plurality of the slots, dividing each slot into two sub-slots, including a first sub-slot having a width smaller than the size and shape of the plurality of the posts of the elongate bodies, and a second sub-slot.

34. The torsionally rigid coupling of claim 33, wherein when the drive shaft is rotated in a preferred forward direction, each of the plurality of the posts of the elongate body that is connected to the drive shaft engaging a solid wall of one of the plurality of the slots in which the post is disposed, thus positively transferring a torque from the drive shaft to the hollow core nest, and each of the plurality of the posts that is connected to the driven member engaging a solid wall of the slot in which the post is disposed, thus positively transferring a torque from the hollow core nest to the driven member, and when the drive shaft is rotated in a reverse direction, each post of the elongate body that is connected to the drive shaft engaging the strip of material disposed in the slot in which the post is disposed, thus transferring a torque from the drive shaft to the hollow core nest with a compliance corresponding to a deflection of the strip, and each post of the elongate body that is connected to the driven member engaging the strip of material disposed in the slot in which the post is disposed, thus transferring a torque from the nest to the driven member with a compliance corresponding to a deflection of the strip.

35. The torsionally rigid coupling of claim 33, further comprising an end cap disposed on the first end of the hollow core nest, preventing the plurality of the posts from disengaging from the plurality of the slots.

36. The torsionally rigid coupling of claim 33, further comprising a plurality of shims, each shim having a size and a shape generally corresponding to a size and a shape of each of the second sub-slots, said shims being disposed in the second sub-slots so as to limit a deflection of the strip of material, thereby substantially reducing a noise level that would otherwise exist during rotation of the torsionally rigid coupling.

37. The torsionally rigid coupling of claim 36, wherein the plurality of the shims comprise an elastomeric material.

38. The torsionally rigid coupling of claim 36, wherein the plurality of the shims are integrally joined together.

39. The torsionally rigid coupling of claim 31, wherein the at least one spring element comprises a helical coil spring extending between and connected to a post on one of the elongate bodies and a post on the other of the elongate bodies, said biasing force produced by the helical coil spring causing each post connected thereto to positively contact a side wall of the slots in which said post are disposed.

40. The torsionally rigid coupling of claim 39, wherein the one and the other of the posts each include a hook that engages a different end of said helical coil spring.

41. The torsionally rigid coupling of claim 39, wherein the hollow core nest includes a channel formed around its external surface for each helical coil spring.

42. The torsionally rigid coupling of claim 28, wherein four slots are disposed at about 90° intervals around the hollow core nest, and each elongate body includes two posts disposed about 180° apart, the posts of the one elongate body being positioned about 90° apart from the posts of the other elongate body.

* * * * *